US008944108B2

(12) United States Patent
Stroganov et al.

(10) Patent No.: US 8,944,108 B2
(45) Date of Patent: Feb. 3, 2015

(54) HYDRAULIC BUFFER

(76) Inventors: Alexander Anatolyevich Stroganov, St. Petersburg (RU); Leonid Olegovich Sheshin, St. Petersburg (RU)

(*) Notice: Subject to any disclaimer, the term of this patent is extended or adjusted under 35 U.S.C. 154(b) by 0 days.

(21) Appl. No.: 14/005,627

(22) PCT Filed: Oct. 27, 2011

(86) PCT No.: PCT/RU2011/000852
§ 371 (c)(1),
(2), (4) Date: Sep. 17, 2013

(87) PCT Pub. No.: WO2012/134338
PCT Pub. Date: Oct. 4, 2012

(65) Prior Publication Data

US 2014/0000741 A1 Jan. 2, 2014

(30) Foreign Application Priority Data

Mar. 28, 2011 (RU) ................................ 2011112504

(51) Int. Cl.
*F16L 55/04* (2006.01)
*F15B 1/04* (2006.01)
*F15B 1/08* (2006.01)
*F15B 3/00* (2006.01)

(52) U.S. Cl.
CPC ... *F15B 1/04* (2013.01); *F15B 1/08* (2013.01); *F15B 3/00* (2013.01); *F15B 2201/3151* (2013.01); *F15B 2201/32* (2013.01); *F15B 2201/42* (2013.01); *F15B 2201/205* (2013.01); *F15B 2201/3152* (2013.01)
USPC ................................ 138/30; 138/26; 220/721

(58) Field of Classification Search
USPC ....................................... 138/30, 26; 220/721
See application file for complete search history.

(56) References Cited

U.S. PATENT DOCUMENTS

| | | | | |
|---|---|---|---|---|
| 2,540,676 | A | 2/1951 | Johnson et al. | |
| 3,230,976 | A * | 1/1966 | Mercier | 138/30 |
| 3,933,172 | A * | 1/1976 | Allen | 137/494 |
| 6,588,377 | B1 * | 7/2003 | Leary et al. | 122/19.1 |
| 7,918,246 | B2 | 4/2011 | Stroganov | |
| 2002/0117223 | A1 | 8/2002 | Henry et al. | |

FOREIGN PATENT DOCUMENTS

| | | | |
|---|---|---|---|
| RU | 2382913 | C1 | 2/2010 |
| SU | 369301 | A | 4/1973 |
| SU | 1219863 | A | 3/1986 |

OTHER PUBLICATIONS

Exner, et al., "Hydraulic drive. Fundamentals and components. 2nd Russian edition.", Bosch Rexport, AG Service Automation Didactics, Erbach Germany, 2003, p. 156c.

* cited by examiner

*Primary Examiner* — Patrick F Brinson
(74) *Attorney, Agent, or Firm* — Christopher L. Parmelee; Walker & Jocke

(57) ABSTRACT

The invention is related to mechanical engineering and can be used in fluid power systems for transfer of fluid power between working fluids with different temperatures at reduced heat exchange between them.
The objective of the present invention is creation of a hydraulic buffer for fluid power transfer between working fluids with different temperatures at reduced heat exchange between them.
The objective is achieved by the proposed hydraulic buffer (hereinafter—the buffer) comprising a housing with at least two variable-volume reservoirs separated from one another, each of them communicating with its port in the housing. The variable-volume reservoirs are separated from one another by at least two separators with at least one buffer reservoir made between them filled with working fluid preferably with low heat conductivity, i.e. not exceeding 0.2 W/m/K.

8 Claims, 2 Drawing Sheets

HYDRAULIC BUFFER

Figure 1:
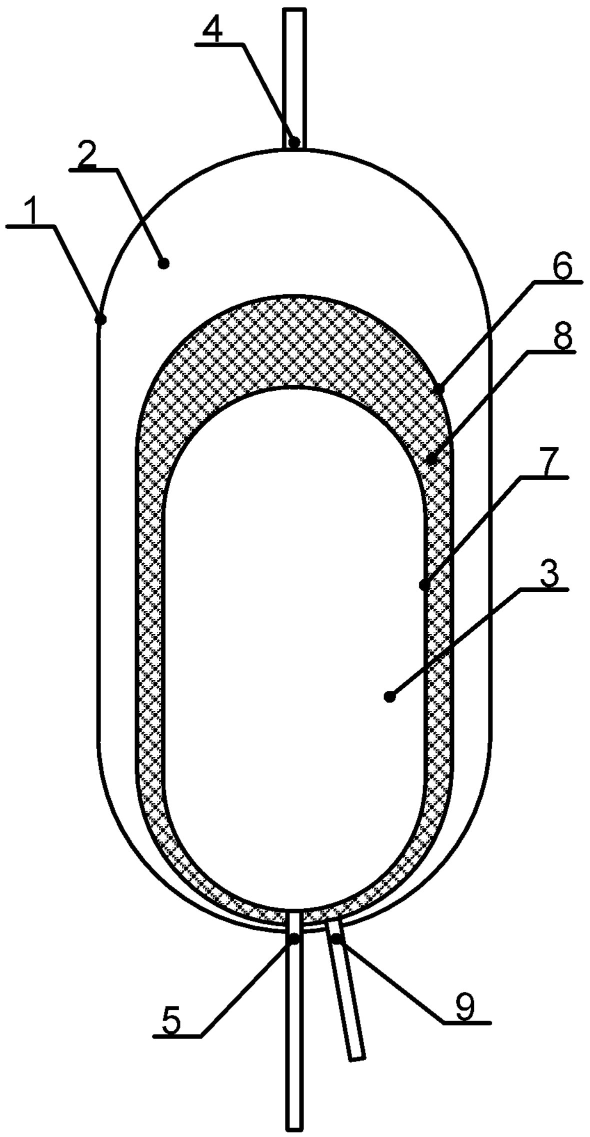

The invention is related to mechanical engineering and can be used in fluid power systems for transfer of fluid power between working fluids with different temperatures at reduced heat exchange between them.

STATE-OF-THE-ART

There are devices for transfer of fluid power between working fluids isolated from one another (hydraulic buffers) in the form of hydropneumatic accumulators (hereinafter—the accumulators), their housing containing at least two variable-volume reservoirs filled with fluids via respective ports, while said variable-volume reservoirs are separated from one another by a separator movable relative to the housing.

Used as hydraulic buffers are generally accumulators with elastic separators, for example, in the form of elastic polymeric membranes or bladders [1].

In case of the use of accumulators for transfer of fluid power between working fluids with different temperatures their disadvantage is the high level of heat losses caused by heat exchange between the fluids through the separator and the walls of the housing of the accumulator.

The system proposed in [1 ]for separation of two fluid mediums in petrochemical compressors chosen as the closest analog includes an accumulator connected via one of its ports with the sealing fluid rail and via another port with a tank with fluid neutral to gas at the compressor discharge. This application of the accumulator allows efficient isolation of two fluids with different properties from one another and pressure transfer between them. However, in the applications with different temperatures of the two fluids such an application of a standard accumulator as a buffer between the fluids will result in intensive heat exchange between the fluids through the separator of the accumulator, in undesirable cooling of the hotter fluid and heating of the colder fluid as well as in general heat losses in the system.

ESSENCE OF THE INVENTION

The objective of the present invention is creation of a hydraulic buffer for fluid power transfer between working fluids with different temperatures at reduced heat exchange between them.

The objective is achieved by the proposed hydraulic buffer (hereinafter—the buffer) comprising a housing with at least two variable-volume reservoirs separated from one another, each of them communicating with its port in the housing. The variable-volume reservoirs are separated from one another by at least two separators with at least one buffer reservoir made between them filled with working fluid preferably with low heat conductivity, i.e. not exceeding 0.2 W/m/K.

Thus, during transfer of the fluid power between the working fluids with different temperatures the heat exchange between them occurs through at least one buffer reservoir and two separators separating the buffer reservoir from the reservoirs with working fluids of different temperatures.

The movable separators can be made in the form of pistons. To reduce the heat losses of cyclic heating and cooling of the massive walls of the buffer housing the separators are preferably made elastic, for example, in the form of elastic membranes or in the form of bladders inserted into one another. Such embodiment of the separators allows avoiding contact of working fluids of different temperatures with the same section of the walls of the housing and, thus, losses for thermo-cycling this section of the housing. In the embodiment of the buffer with bladder-type separators only one of the fluids is in contact with the housing, i.e. the temperature of the housing does not change when power is transferred between the fluids. When using bladders as separators it is expedient to make them spherical ensuring the minimum ratio between the surface area and the internal volume. In the embodiment of the buffer with membrane separators the volumes of the variable-volume reservoirs change only due to deformation of the separators but not due to the changed ratio of the areas of the housing surfaces being in contact with the fluids, which also allows avoiding thermo-cycling the housing.

To increase the working range of the temperatures at least one of the elastic separators should be preferably made from the material capable of being used at increased temperatures, preferably of 200° C. or higher, for example, from polyamide or organosilicone polymers. At least one elastic membrane can be also made from metal.

To reduce heat exchange through convective flows of fluids in the buffer reservoir means of convection suppression are made in it.

In the embodiment of the buffer with separators in the form of bladders inserted into one another the means of convection suppression are made in the form of a flexible porous filler (for example, foamed polyurethane with open pores) filling the volume of the buffer reservoir.

In the embodiment of the buffer with separators in the form of elastic membranes the means of convection suppression can be also made as an aggregate of elements inserted into one another, preferably cylindrical ones, located inside the buffer reservoir along its axis. The cylindrical elements are made with the possibility of axial movement relative to one another similar to a telescopic structure. Without preventing the synchronous motion of the membranes they reduce considerably convection of the fluid inside the buffer.

For further reduction of convective heat losses the buffer volume is preferably filled with the fluid with reduced heat conductivity (not more than 0.2 W/m/K) and increased viscosity (not less than 50 cSt at the working temperature of 100° C. or higher.

For still greater reduction of heat transfer along the walls of the buffer housing the housing includes at least one heat-insulating element made so as its heat conductivity in at least one direction does not exceed 20 W/m/K; the said heat-insulating element forms the external walls of at least one buffer reservoir.

The parts of the invention are described in more detail in the example given below and illustrated by the drawings presenting:

FIG. 1—Schematic view of the hydraulic buffer with one buffer reservoir and two separators in the form of bladders inserted into one another.

Figure 2:
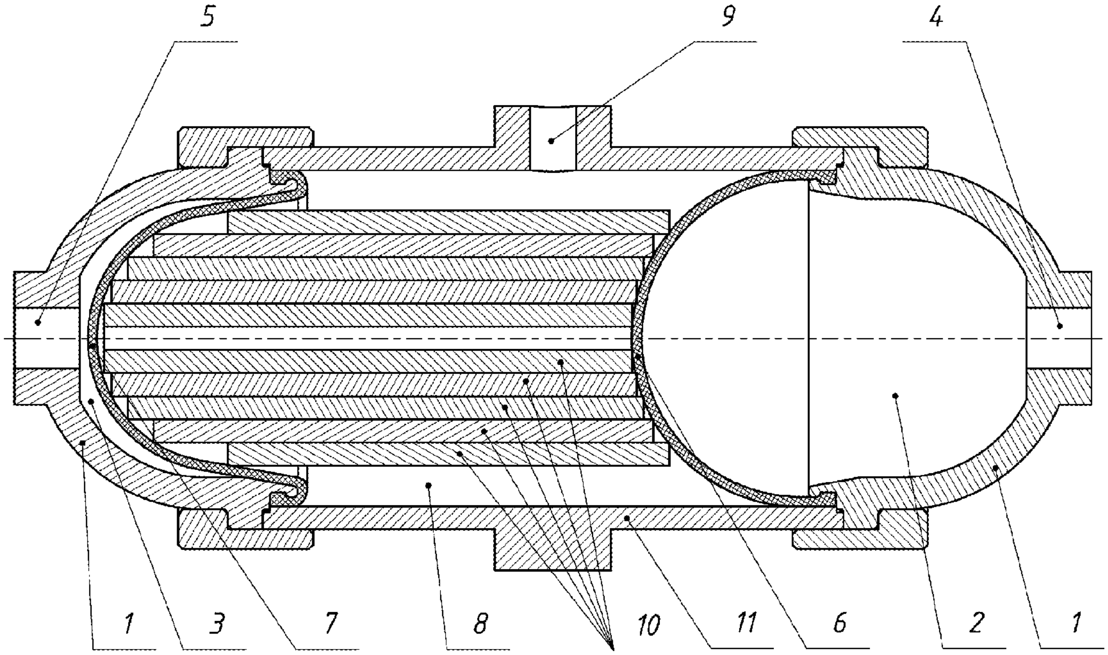

FIG. 2—Schematic view of the hydraulic buffer with two separators in the form of elastic membranes and one buffer reservoir and the aggregate of coaxial cylinders inserted into it.

The hydraulic buffer according to FIG. 1 includes the housing 1 containing variable-volume reservoirs 2 and 3 communicating with ports 4 and 5, respectively. The variable-volume reservoirs 2 and 3 are separated from one another by two movable separators in the form of elastic bladders 6 and 7, with the buffer reservoir 8 between them communicating with the port 9.

FIG. 2 presents the buffer with movable separators in the form of elastic membranes 6 and 7 and means of convection suppression in the form of the aggregate of coaxial cylinders 10 placed in the buffer reservoir 8.

When fluid power is transferred from the first working fluid with the first temperature filling the variable-volume reservoir 2 through the port 4 (FIG. 1, 2) to the second one filling the variable-volume reservoir 3, the separator 6 deforms due to its elasticity transferring the excessive pressure and positive displacement to the fluid filling the buffer reservoir 8. Through the elastic separator 7 the latter fluid transfers the pressure and positive displacement to the second working fluid with the second temperature filling the variable-volume reservoir 3 and displacing it into the port 5. In a similar way the pressure and positive displacement are transferred in the opposite direction from the second fluid to the first one. This way the bidirectional transfer of fluid power between fluid power subsystems with different temperature is provided. Due to the fact that the areas of the surface of the housing 1 being in contact with the first and second working fluids do not change in the process of fluid power transfer (as seen from FIG. 1, 2), the heat transfer through the housing is determined only by the configuration of its walls (thickness of the walls and lengths of the heat-transferring sections) and their heat conductivity. In the embodiment according to FIG. 2 the housing contains the heat-insulating element 11 made from a material with reduced heat conductivity along the axis of the buffer, for example, made from stainless steel with heat conductivity of not more than 20 W/m/K or, preferably, from a composite material with heat conductivity along the axis of the buffer of not more than 5 W/m/K. By increasing the length of the heat-insulating element 11 and using a material with reduced heat conductivity it is possible to reduce heat transfer through this element of the housing down to a given small value. Thus, the major heat exchange between the first and second working fluids occurs through the buffer reservoir 8 itself, namely through the fluid and means of convection suppression placed in it. Placed in the buffer reservoir 8 is the fluid designed for work under the set pressure and temperatures and having low heat conductivity (for example, vaseline oil or silicone oil with the heat conductivity factor in the range of 0.1-0.15 W/m/K) or high viscosity, preferably having both, for example, silicone oil with heat conductivity below 0.15 W/m/K and viscosity from 50 cSt at the working temperatures of the hotter fluid (preferably at the temperatures of 100° C. or higher). High viscosity of fluid hinders development of convective flows in the buffer reservoir, which, together with reduced heat conductivity, reduces convective heat transfer between the membranes 6 and 7 and, hence, between the first and second working fluids. The aggregate of coaxial cylinders 10 in the buffer reservoir 8 (FIG. 2) also prevents development of convective flows in the fluid of the buffer reservoir 8. The cylinders are made from a material with low heat conductivity, preferably not more than 1 W/m/K (for example, for temperatures below 150° C.—from a polypropylene-type polymer with the heat conductivity factor of about 0.2 W/m/K and for temperatures below 300° C.—from a polyimide-type polymer with the heat conductivity factor of 0.5 W/m/K). In other embodiments of the hydraulic buffer with membrane separators the means of convection suppression may include several additional membranes breaking the buffer reservoir into several successively located buffer reservoirs.

The buffer reservoir 8 of the hydraulic buffer with bladder-type separators according to FIG. 1 may additionally contain means of convection suppression in the form of a flexible porous filler, for example, based on foamed polyurethane with open pores (not shown in the figure). In this case no convective heat transfer occurs between the bladders 6 and 7 forming the buffer reservoir 8, and the heat exchange between the first and second working fluids is reduced to the minimum.

The embodiments described above are examples of the embodiment of the main idea of the present invention that also supposes variety of other embodiments that are not described here in detail, for example, the embodiments differ by the choice of materials for separators, heat-insulting insert, type of fluid in the buffer reservoir, embodiments of the means of convection suppression and materials used in them as well as the number of successively placed buffer reservoirs.

Thus, the proposed solutions allow creating a hydraulic buffer for fluid power transfer between the working fluids with different temperatures with the following properties:

- reduced heat transfer between the working fluids and, hence, reduced heat losses during fluid power transfer;
- manufacturability with the use of elements of standard hydraulic accumulators.

REFERENCES

1—H. Exner, R. Freitag, Dr. H. Gais, R. Lang, Y. Oppoltser, P. Shwab, E. Zumpf, U. Ostendorff, M. Ryke. Hydraulic drive. Fundamentals and components. 2nd Russian edition. Bosch Rexport AG Service Automation Didactics Erbach Germany, 2003, p. 156c

The invention claimed is:

1. A hydraulic buffer comprising a housing with at least two variable-volume liquid reservoirs in it separated from one another, each of them communicating with its port in the housing, wherein said variable-volume liquid reservoirs are separated from one another by at least two separators with at least one liquid buffer reservoir made between them and at least in one buffer reservoir means of convection suppression are made.

2. The hydraulic buffer according to claim 1 wherein said separators are made elastic.

3. The hydraulic buffer according to claim 2 wherein said separators are made in the form of elastic membranes.

4. The hydraulic buffer according to claim 2 wherein at least two of said separators are made in the form of bladders inserted into one another.

5. A hydraulic buffer comprising a housing with at least two variable-volume liquid reservoirs in it separated from one another, each of them communicating with its port in the housing, wherein said variable-volume liquid reservoirs are separated from one another by at least two separators with at least one liquid buffer reservoir made between them, wherein said separators are made elastic, wherein at least one of said separators is made from a material capable of being used at a temperature of 200° C. and higher.

6. The hydraulic buffer according to claim 4 wherein the means of convection suppression includes a flexible porous filler.

7. The hydraulic buffer according to claim 3 wherein the means of convection suppression includes an aggregate of cylinders located along the axis of the liquid buffer reservoir and inserted into one another with the possibility of axial movement relative to each other.

8. A hydraulic buffer comprising a housing with at least two variable-volume liquid reservoirs in it separated from one another, each of them communicating with its port in the housing, wherein said variable-volume liquid reservoirs are separated from one another by at least two separators with at least one liquid buffer reservoir made between them, wherein the housing includes at least one heat-insulating element made so as its heat conductivity at least in one direction does not exceed 20 W/m/K while said heat-insulating element forms the external walls of at least one liquid buffer reservoir.

* * * * *